Aug. 28, 1962 A. KIRCHER, JR 3,051,400
GRANULATING APPARATUS
Filed April 25, 1960 2 Sheets—Sheet 2
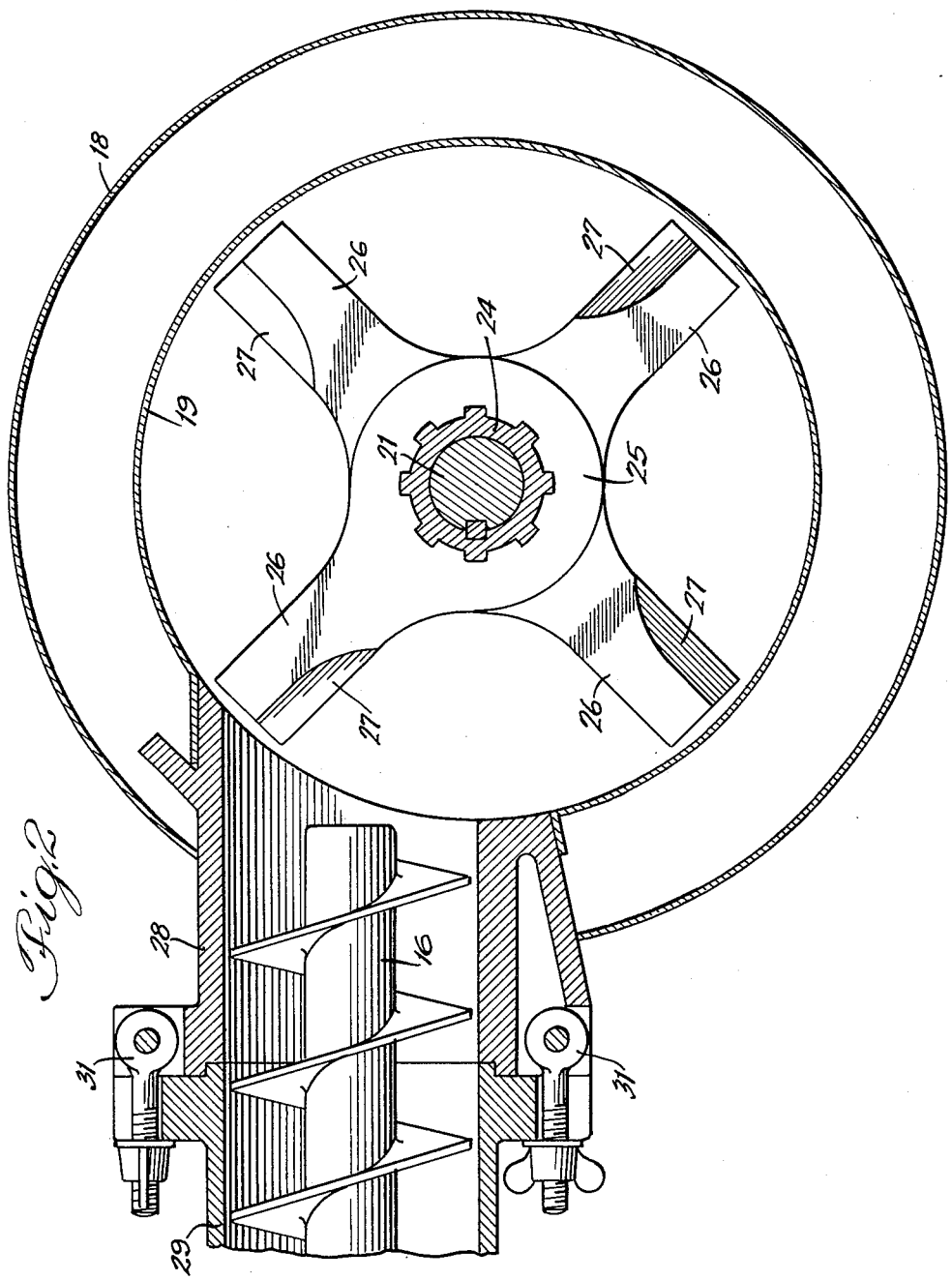
INVENTOR:
Albert Kircher Jr.,
BY
Bair Freeman & McLinare
ATTORNEYS.

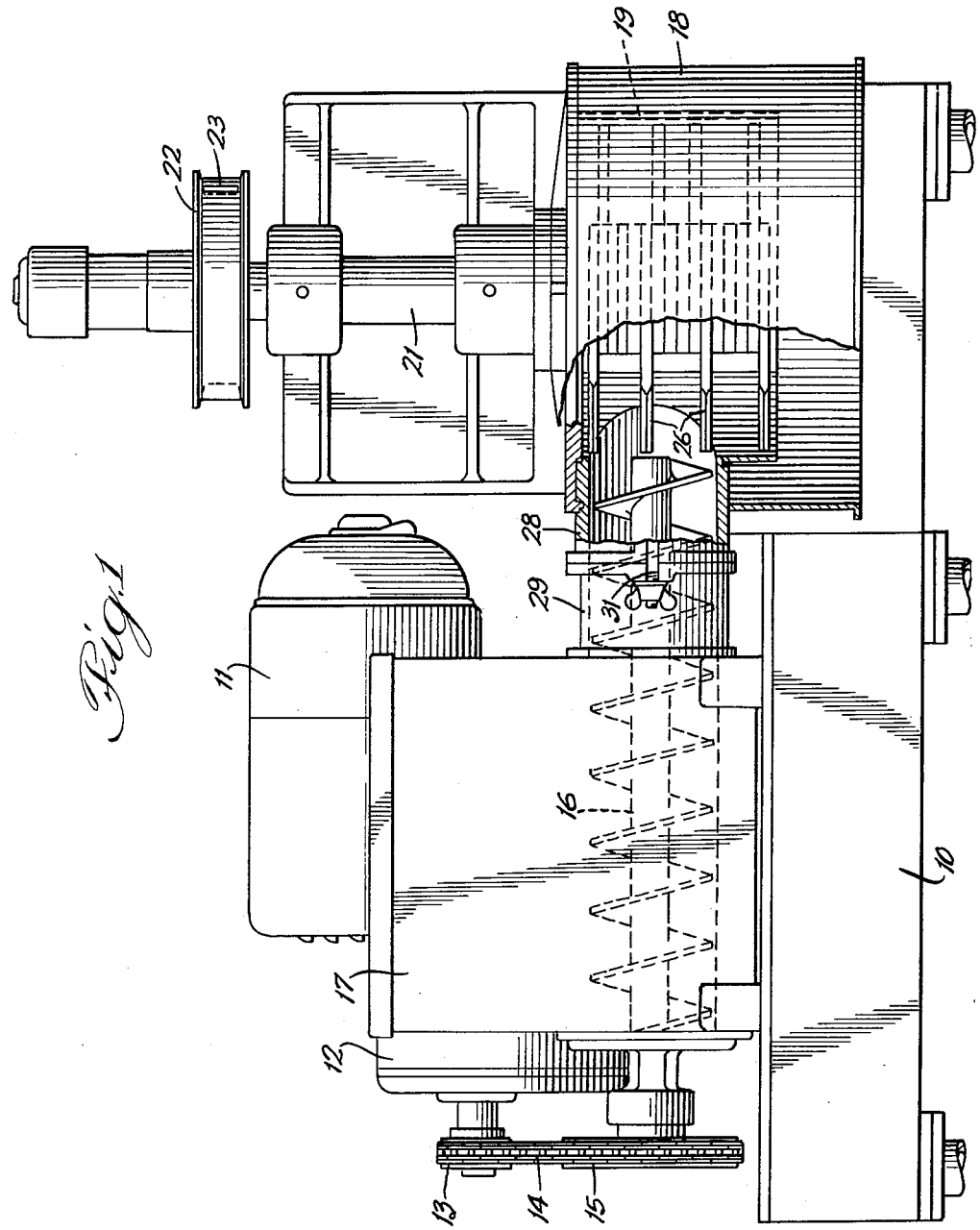

United States Patent Office 3,051,400
Patented Aug. 28, 1962

3,051,400
GRANULATING APPARATUS
Albert Kircher, Jr., Downers Grove, Ill., assignor to The Fitzpatrick Company, a corporation of Illinois
Filed Apr. 25, 1960, Ser. No. 24,563
3 Claims. (Cl. 241—186)

This invention relates to granulating apparatus and more particularly to the granulation of wet, sticky mixtures of solids and liquids.

In granulating wet mixtures in the ceramic industry, for example, it has been the usual practice to mix the dry powdered material with 18 to 20% water and suitable binders in a mulling machine and to continue the mixing until the dispersion is complete. The resulting mixture is then granulated in a granulating mill as, for example, of the type disclosed and claimed in the patent to Magnus, No. 2,348,916.

The granulating operation has been difficult to perform and has not been entirely satisfactory due to the fact that the mixture coming from the muller is more or less thixotropic and is difficult to granulate. Machines of this type normally use a screen to prevent the passage of granules of larger than the desired size and because of the nature of the material the screen tends to clog or blind. To overcome this difficulty, it has been customary to employ an oversized screen and to reprocess the oversized granules obtained from a separate screening operation.

Similar problems are encountered in mixing and granulation of pharmaceutical products which contain a high percentage of sugar or similar materials and liquids. Even though these mixtures may not be thixotropic, they do tend to blind or clog the screen so that they cannot be granulated in a satisfactory manner.

It is one of the objects of the present invention to provide a granulating apparatus in which the wet or sticky materials can be granulated rapidly and uniformly with no clogging or blinding of the apparatus.

Another object is to provide a granulating apparatus in which the material is granulated by forcing it through a feed conduit and rapidly picking off small increments of material as it leaves the conduit.

According to a feature of the invention the wet, sticky mixture is forced through a horizontal feed conduit toward the tips of a series of blades rotating rapidly on a vertical axis. The blade tips sweep rapidly across the face of the mass to pick off small increments therefrom and these increments drop in a vertical helical path through the series of blades to be further broken up thereby and are discharged freely without passing through a screen or other obstruction which might clog or blind.

The above and other objects and features of the invention will be more readily apparent from the following description when read in connection with the accompanying drawings, in which:

FIGURE 1 is a side elevation with parts broken away and in section of a granulating apparatus embodying the invention; and FIGURE 2 is an enlarged partial horizontal section illustrating the rotor and feed conduit.

The apparatus, as shown, comprises a base or frame 10 which may be supported at a convenient distance above the floor and which carries a feed drive motor 11 driving through a gear reduction 12 to a sprocket 13. The sprocket 13 is connected through a chain 14 to a sprocket 15 on the end of a feed screw shaft 16 which lies in the lower part of a hopper 17. The mixture to be fed is placed in the hopper and is fed therefrom by the feed screw 16 to the granulating apparatus, as described more fully hereinafter.

The granulating apparatus comprises a vertical casing 18 within which a cylindrical vertical shroud 19 is mounted. A rotor is mounted in the shroud for rotation on a vertical axis and is driven by a vertical shaft 21 which is turned at high speed through a sheave 22 driven by a belt 23 from a separate drive motor, not shown. Conveniently the drive motor or the gear drive unit therefor may lie with its drive shaft vertically behind the supporting framework for the shaft 21, shown in FIGURE 1, to drive the belt 23.

The rotor, as shown in FIGURES 1 and 2, comprises a sleeve 24 keyed to the shaft 21 within the shroud 19 and having a series of blades stacked and secured thereon in axially and angularly displaced relationship. Each of the blades, as best seen in FIGURE 2, comprises a circular hub portion 25 internally splined to fit over the splines on sleeve 24 and with a blade portion 26 extending radially from the hub portion. Each of the blade portions is a relatively thin flat metal strip sharpened at its leading edge, as indicated at 27. The blades may be displaced in any desired pattern, but as shown are in four vertical rows and are axially staggered so that together they occupy the full axial length of the rotor within the shroud 19.

The material from the hopper 17 is fed by the feed screw through an inlet sleeve 28 which is secured through a sleeve extension 29 to the hopper with the feed screw 16 extending into the inlet sleeve 28, but terminating short of the rotor blades, as shown in FIGURE 2. The inlet sleeve is preferably easily replaceable by means of bolts 31 so that it can be changed for different sleeves having different degrees of restriction or can be easily replaced in the event of wear thereon. As shown in FIGURE 2, the shroud 19 is formed with an opening to fit over the inlet sleeve and to be supported thereby so that the interior surface of the shroud will closely overlie the tips of the blades 26. The bottom of the shroud is open for free discharge of material therefrom and the bottom of the casing 18 may be formed for the attachment of a bag or other receptacle thereto to receive the granulated material.

As best seen in FIGURE 2, the inlet sleeve is so positioned that an extension thereof through the shroud 19 would lie entirely at one side of the rotor axis which is upstream with respect to travel of the blades across the inlet opening. Thus the blades tend to drive the material back into the inlet opening so that the blades will pick off relatively small particles of the material at the inlet opening and will not have any tendency to drag large chunks of material from the inlet opening.

In operation, with the rotor turning and with the feed screw being driven the material in the hopper 17 is forced through the sleeves 29 and 28 by the feed screw and will be compressed therein to a relatively high mass. As this mass advances through the inlet sleeve 28, the tips of the blades 26 will move at high speed across the surface thereof to pick off relatively small particles of the mass. These particles will drop by gravity through the rotor blades and will be carried in a generally helical path by the action of the blades until they drop from the lower end of the shroud into the receptacle provided to receive them. Any oversized particles will be struck by the blades as they drop through the rotor to be reduced to the desired particle size. It has been found in operation of apparatus of this character that materials which are extremely difficult to granulate because of their wet or sticky natures, whether or not they are thixotropic, can be granulated rapidly and uniformly. The size of the granules can be controlled quite accurately by controlling the relative speeds of the feed screws 16 and the rotor so that substantially any desired fineness of granulation can be achieved.

While one embodiment of the invention has been shown and described herein, it will be understood that it

What is claimed is:

1. Granulating apparatus comprising a vertical cylindrical casing having an inlet opening in its side wall adjacent to its top and closed at its top and open at its bottom for discharge of granulated material, a rotor rotating on a vertical axis in the casing, a plurality of spaced radially projecting relatively thin horizontal flat blades on the rotor terminating adjacent to the casing wall to sweep closely across the inlet opening as the rotor turns, said blades spanning an axial space from the casing top to a point substantially below the bottom of the inlet opening, and means to force material to be granulated into the inlet opening to be picked off by the tips of the blades as they pass the inlet opening, to be granulated by the blades and to drop from the open bottom of the casing by gravity.

2. The granulating apparatus of claim 1 in which the forcing means includes a conduit communicating with the inlet opening and positioned so that an extension of the conduit would lie substantially entirely at the side of the rotor axis which is upstream with respect to travel of the blades across the inlet opening.

3. Granulating apparatus comprising a vertical cylindrical casing having an inlet opening in its side wall adjacent to its top and closed at its top and open at its bottom for discharge of granulated material, a rotor rotating on a vertical axis in the casing, a plurality of spaced radially projecting relatively thin horizontal flat blades on the rotor terminating adjacent to the casing wall to sweep closely across the inlet opening as the rotor turns, said blades spanning an axial space from the casing top to a point substantially below the bottom of the inlet opening, an inlet conduit communicating with the inlet opening, and a feed screw extending into the conduit to compress loose material in the conduit and to force the compressed material through the inlet opening.

References Cited in the file of this patent

UNITED STATES PATENTS

| | | |
|---|---|---|
| 937,411 | Block | Oct. 19, 1909 |
| 1,711,464 | Ruprecht | Apr. 30, 1929 |
| 1,925,618 | Wetmore | Sept. 5, 1933 |
| 2,294,921 | Lykken | Sept. 8, 1942 |
| 2,541,264 | McGihon | Feb. 13, 1951 |
| 2,669,924 | Wiemer | Feb. 23, 1954 |
| 2,711,964 | Wiemer | June 28, 1955 |